Jan. 21, 1969     J. A. SNOVER     3,423,192
PREPARATION OF LITHIUM BOROHYDRIDE
Original Filed July 11, 1963
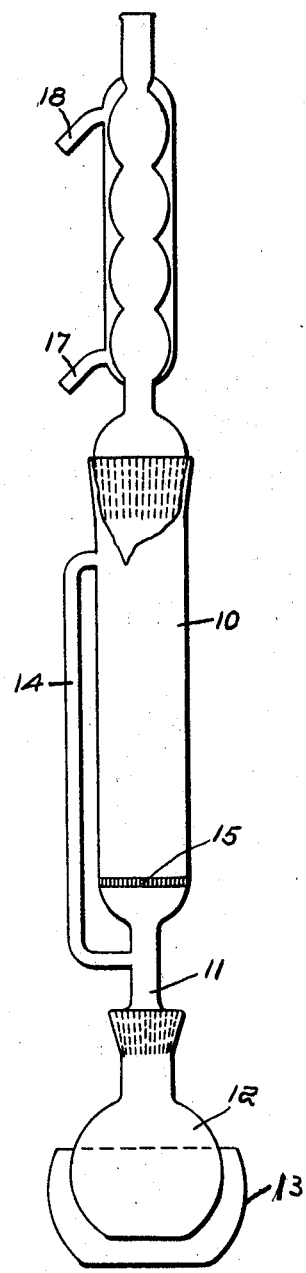
Inventor:
John A. Snover,
by J. Harold Root
      Attorney 3,423,192
PREPARATION OF LITHIUM BOROHYDRIDE
John A. Snover, Peabody, Mass., assignor to Metal Hydrides Incorporated, Beverly, Mass., a corporation of Massachusetts
Continuation of abandoned application Ser. No. 294,371, July 11, 1963. This application Mar. 18, 1964, Ser. No. 354,202
U.S. Cl. 23—364   6 Claims
Int. Cl. C01b 6/08; B01d 11/00; B01d 59/24

ABSTRACT OF THE DISCLOSURE

A mixture of sodium borohydride and lithium chloride is placed on a filter and diethyl ether is condensed above it and allowed to drain through the mixture into a heated distillation pot below it, where the ether is distilled off and returned to the condenser. Small amounts of lithium borohydride are dissolved in the ether as it passes through the mixture and remain in the distillation pot. The diethyl ether may be replaced by other low-boiling ethers which are solvents for lithium borohydride and nonsolvents for sodium chloride, lithium chloride, and sodium borohydride, such as dibutyl ether or diisopropyl ether.

---

The present invention relates to methods for preparing lithium borohydride by reacting lithium chloride with sodium borohydride.

It is known that lithium borohydride is very soluble in diethyl ether [D. A. Bandreth and M. C. Molstad, J. Chem. and Eng. Data, 7, 4 (1962), p. 449]. It is also known that the metathetical reaction of sodium borohydride and lithium chloride does not proceed in diethyl ether [R. Paul and N. Joseph, Bull. Soc. Chim., France, 550 (1952); ibid., 758 (1955)].

Lithium borohydride can be made by the metathetical reaction of lithium chloride and sodium borohydride in an amine solvent such as isopropyl amine. [H. I. Schlesinger and H. C. Brown and E. K. Hyde, J. Am. Chem. Soc., 75, 209 (1953)]. However, this process requires the use of excess lithium chloride to obtain complete reaction. This excess lithium chloride is removed by redissolving the crude product, after complete removal of the amine solvent, in diethyl ether, filtering and redrying the lithium borohydride. This method on a large scale has been found to be cumbersome, due to the many steps involved, and also somewhat erratic.

It has been found that, if sodium borohydride and lithium chloride are mixed in isopropyl amine and then this solvent is removed without first filtering off the insoluble sodium chloride, lithium borohydride cannot be extracted in a single ether extraction from this solid mixture. X-ray analysis of this mixture indicates it to be a mixture of sodium borohydride and lithium chloride containing only trace amounts of sodium chloride. This would indicate an equilibrium-type reaction which goes to form $LiBH_4$ in dilute isopropyl amine solution, but is reversed when the solvent is removed.

I have discovered that if a mixture of sodium borohydride and lithium chloride is placed on a filter and diethyl ether is condensed above it and allowed to drain through the mixture into a heated distillation pot below it, where the ether is distilled off and returned to the condenser above the filter, then yields of 60 to 90 percent of the theoretical amount of high purity lithium borohydride can be obtained.

In the practice of the method of the invention it is preferred to utilize a mixture of sodium borohydride and lithium chloride in finely divided form. This finely divided mixture may be formed in various ways, such as by (1) grinding solid sodium borohydride with solid lithium chloride in a rod mill or the like for a suitable period of time, (2) heating a mixture of sodium borohydride and lithium chloride at a suitable temperature and for a period of time, such as a temperature of about 350° C. for 15 minutes, to fuse the mixture or cause at least incipient fusion, and then finely dividing the product as by grinding or crushing, (3) compacting a mixture of solid sodium borohydride and solid lithium chloride under heavy pressure, such as about 12,000 p.s.i., and (4) dissolving in a solvent, such as isopropylamine, and removal of the solvent without filtration.

In the practice of the invention diethyl ether may be replaced by other low-boiling ethers which are solvents for lithium borohydride and non-solvents for sodium chloride, lithium chloride, and sodium borohydride. Thus, dibutyl ether or diisopropyl ether may be used but a higher temperature is required for distilling these ethers from the distillation pot.

The invention is illustrated further by the following description in conjunction with the single figure in the accompanying drawing, which is an elevational view of a glass apparatus suitable for use in the practice of the method of the invention.

The apparatus shown in the drawing comprises a hollow glass cylindrical body, 10, having a reduced lower portion, 11, fitted into the neck of a glass flask, 12. An electric heating mantle, 13, is associated with the flask, 12. A glass tube, 14, provides communication between the portion, 11, and the upper portion of the body, 10. A coarse-porosity fritted glass disc, 15, is sealed in the body, 10. A condenser, 16, is fitted into the upper end of the body, 10, and is provided with an inlet, 17, and outlet, 18, for circulation of a cold liquid.

In using the apparatus shown in the drawing in practicing the method of the invention, the solvent, such as diethyl ether, is placed in the flask, 12. The mixture of sodium borohydride and lithium chloride is placed in the body, 10, upon the glass disc, 15, and then the flask, 12, and condenser, 16, are fitted on to the body, 10. The coolant is circulated through the condenser and the heating mantle is connected to a source of electric energy. The solvent is distilled, the vapor passing through the tube, 14, and into the condenser, where it is condensed to liquid. The condensed solvent passes from the condenser on to the mixture of sodium borohydride and lithium chloride and through the mixture into the flask, 12. As the solvent passes through the mixture, a small amount of lithium borohydride is formed and dissolved therein. Solvent is removed from the solution thus formed, the lithium borohydride remaining in the flask, 12. The solvent thus removed as vapor passes upward into the condenser, where it is condensed to liquid. This condensed solvent, substantially free of lithium borohydride, then flows down through the mixture of sodium borohydride and lithium chloride to form, and dissolve, another small amount of lithium borohydride, the solution flowing into the flask, 12. This cycle is continued until the reaction between the sodium borohydride and lithium chloride has been completed.

The invention is illustrated further by the following specific examples.

EXAMPLE 1

64 grams of sodium borohydride dried under vacuum at 100° C. was mixed with 72 grams of lithium chloride dried under vacuum at 300° C. and the mixture was ball-milled for 18 hours. One hundred grams of the milled mixture was placed in the apparatus shown in the accompanying drawing. 500 ml. of dried diethyl ether were added down the condenser and the flask heated. The ether was distilled, the vapor passing up to the condenser, where it was condensed. The condensate dropped downward through the milled mixture and was returned to the flask. The rate of distillation was controlled by the heat input into the heating mantle. The rate was adjusted so that the level of ether in the apparatus was above the level of the solid mixture. After two days of continuous operation in this manner, the heat was turned off and the apparatus allowed to drain. The flask and solution were removed and attached through a Dry Ice trap to a vacuum pump. The majority of the ether was removed at ambient temperature, during which time the entire solution solidified. Then heat was applied up to 150° C. under vacuum of less than 1 mm. of mercury. There was obtained 23 grams of material which analyzed by hydrogen evolution to be 98.7 percent lithium borohydride, the over-all chemical yield being 83 percent.

EXAMPLE 2

An equimolar mixture of dried sodium borohydride and lithium chloride was fused under argon atmosphere at 330–350° C. for 15 minutes. The melt was crushed up to less than ¼-inch particle size and subjected to treatment with ether as in Example 1. The clear filtrate was evaporated to dryness under vacuum with heating. High purity lithium borohydride was obtained in good yield.

EXAMPLE 3

An equimolar mixture of dried sodium borohydride and lithium chloride was passed through a hammer-mill under an inert atmosphere where the particle size was reduced to less than a 100-mesh screen. Treatment with diethyl ether and removal of the ether from the solution obtained yielded a good yield of high purity lithium borohydride.

EXAMPLE 4

A 200-gram batch of an equimolar mixture of dried sodium borohydride and dried lithium chloride was placed in a one-liter Morton (fluted) flask. 300 ml. of dry distilled diethyl ether was added and this mixture was subjected to high-speed stirring at 10,000 to 14,000 r.p.m. for three hours. The mixture was then filtered and the filtrate dried under vacuum and heating. There was obtained only trace amounts of soluble materials, such as lithium borohydride, in the filtrate. However, when the solid residue from filtration was treated continuously with diethyl ether as described in Example 1 for 4 days, there was obtained 23.0 grams of lithium borohydride. An additional 3 days treatment yielded 9.3 grams more for a total of 32.3 grams of 97.3 percent purity lithium borohydride, the yield being 58 percent.

EXAMPLE 5

An equimolar mixture of dried sodium borohydride and lithium chloride was stirred for 8 hours in isopropylamine. Then the isopropylamine was removed (without filtration) with vacuum and heating. An X-ray analysis of this solid residue indicated it to be a mixture of lithium chloride and sodium borohydride containing only trace amounts of sodium chloride. A sample of the solid mixture was stirred in 500 ml. of dry diethyl ether, refluxed for several hours, and then filtered. The solution was then evaporated to dryness under vacuum and heating. It was found to contain only a very small amount of lithium borohydride, corresponding to less than 1 percent of the theoretical amount. However, when a 213-gram sample of the reaction mixture was treated continuously with diethyl ether for 3 days, as described in Example 1, there was obtained 38 grams of material which assayed 98.6 percent lithium borohydride. An additional 3 days treatment gave 2.3 grams more of lithium borohydride for a total overall yield of about 70 percent.

I claim:
1. In a method for producing lithium borohydride, the steps which comprise forming a dry mixture of sodium borohydride and lithium chloride, passing a plurality of portions of a solvent, each of which is substantially free of lithium borohydride, successively through said mixture, whereby each of said portions forms a solution containing a small amount of lithium borohydride, distilling solvent from the formed solutions, condensing solvent vapors thus formed, and recycling the condensate through said mixture.
2. The method as claimed by claim 1 wherein said solvent is selected from the group consisting of diethyl ether, diisopropyl ether, and dibutyl ether.
3. The method as claimed by claim 1 wherein said solvent is diethyl ether.
4. The method as claimed by claim 1 wherein said mixture is formed by grinding sodium borohydride with lithium chloride.
5. The method as claimed by claim 2 wherein said mixture is formed by grinding sodium borohydride with lithium chloride.
6. The method as claimed by claim 3 wherein said mixture is formed by grinding sodium borohydride with lithium chloride.

References Cited

UNITED STATES PATENTS 3,151,930    10/1964    Bragdon _____ 23—364 X

EARL C. THOMAS, *Primary Examiner.*

G. O. PETERS, *Assistant Examiner.*

U.S. Cl. X.R.

23—361, 272, 1